US012547679B2

(12) United States Patent
Straubinger et al.

(10) Patent No.: US 12,547,679 B2
(45) Date of Patent: Feb. 10, 2026

(54) ENFORCING EULA VERSION AWARE APPLICATION RESPONSE

(71) Applicant: International Business Machines Corporation, Armonk, NY (US)

(72) Inventors: Ben Lyle Straubinger, Camp Hill (AU); Jasmine Anne Smith, Southport (AU); Matthew Britt, Nerang (AU); Scott Anthony Exton, Shailer Park (AU)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 17/453,223

(22) Filed: Nov. 2, 2021

(65) Prior Publication Data
US 2023/0135201 A1    May 4, 2023

(51) Int. Cl.
*H04L 29/00* (2006.01)
*G06F 21/10* (2013.01)
*G06F 21/12* (2013.01)

(52) U.S. Cl.
CPC ............ *G06F 21/105* (2013.01); *G06F 21/12* (2013.01)

(58) Field of Classification Search
CPC ................. G06F 21/105; G06F 21/12
USPC .......................................... 726/28
See application file for complete search history.

(56) References Cited

U.S. PATENT DOCUMENTS

| 8,224,750 | B1* | 7/2012 | Bennett | G06Q 20/3829 |
| | | | | 705/51 |
| 9,058,469 | B2* | 6/2015 | Rodriguez | G06F 21/10 |
| 9,262,183 | B2 | 2/2016 | Liensberger | |
| 9,727,730 | B2 | 8/2017 | Da Palma | |
| 2005/0066324 | A1* | 3/2005 | Delgado | G06F 8/61 |
| | | | | 717/170 |
| 2007/0083474 | A1* | 4/2007 | Burkhart | G06Q 50/18 |
| | | | | 705/59 |
| 2007/0250448 | A1* | 10/2007 | Burkhart | G06Q 50/18 |
| | | | | 705/59 |
| 2009/0260003 | A1 | 10/2009 | Matsugashita | |
| 2012/0253959 | A1* | 10/2012 | Li | G06Q 30/06 |
| | | | | 726/28 |
| 2016/0284035 | A1 | 9/2016 | Muttik | |
| 2020/0125357 | A1 | 4/2020 | Shantharam | |

* cited by examiner

*Primary Examiner* — Jeffrey C Pwu
*Assistant Examiner* — Michael D Anderson
(74) *Attorney, Agent, or Firm* — Michael O'Keefe (57) ABSTRACT

In an approach to enforcing EULA version aware application response, responsive to receiving a request from a user to access an application, details of an End User License Agreement (EULA) are sent to the application. A response is received from the application based on the details of the EULA. A message is sent to the user, where the message contains the response from the application.

12 Claims, 6 Drawing Sheets

ENFORCING EULA VERSION AWARE APPLICATION RESPONSE

BACKGROUND

The present invention relates generally to the field of software management, and more particularly to enforcing End-User License Agreement version aware application response.

An end-user license agreement (EULA) is a license that gives a user the right to use a software application in some manner. EULAs are designed to enforce specific software use limitations, e.g., only using the software on one computer. By entering into the agreement, the user is given permission to use and benefit from the software. Typically, a EULA includes clauses that restrict the usage of the software. These clauses may include the granting of licenses, infringement information, restrictions on how the application can be used, termination of licensing, and other limitations and disclaimers for the warranties and liability.

SUMMARY

Embodiments of the present invention disclose a method, a computer program product, and a system for enforcing EULA version aware application response. In one embodiment, responsive to receiving a request from a user to access an application, details of an End User License Agreement (EULA) are sent to the application. A response is received from the application based on the details of the EULA. A message is sent to the user, where the message contains the response from the application.

DETAILED DESCRIPTION

An end-user license agreement (EULA) is a license that gives a user the right to use a software application in some manner. EULAs are designed to enforce specific software use limitations, e.g., only using the software on one computer. For a variety of businesses, like consumer goods or in-person services, it is logical to prevent a user from purchasing or using services unless they accept an updated EULA. However, in an increasingly online world where users and clients rely on application programming interfaces (APIs) from a variety of sources, or where APIs are accessed in an automated fashion, blocking access until a singular version of the EULA is accepted may not be practical and does not take into account that APIs could be versioned, i.e., the API is versioned in-sync with the EULA version.

If instead the API is versioned in-sync with the EULA version, the consumer does not lose access to the API when a new version of the EULA is released, the specific changes in the EULA as they relate to the API will be clearer, consumers will have more confidence in the stability of the API, and providers are still protected by their EULAs. The present invention is a computer-implemented method, a computer program product, and a system to enable an application to communicate EULA requirements to a secure gateway. In the present invention, the application determines the EULA requirements that must be enforced, while the secure gateway manages the EULA process, including presenting the EULA to the user, tracking acceptance of the EULA, and enforcing EULA acceptance.

In the present invention, applications are provided with EULA acceptance details for the authenticated user session by the secure gateway. The details include whether the user has accepted the EULA, and the version of the EULA that the user has accepted. The application uses this information to limit the capabilities of the application based on the version of the EULA which has been accepted, or it can return to the secure gateway details of the EULA requirements necessary for the user to access the application. In an embodiments, these EULA requirements may be returned by the application in designated Hypertext Transfer Protocol (HTTP) headers. In another embodiment, these EULA requirements may be returned as a query string argument in a Uniform Resource Locator (URL) string.

The present invention provides several benefits over traditional EULA models. It provides a method for versioning the EULA and keeping track of which version of the EULA has been accepted by a user. In an embodiment, the secure gateway is responsible for managing the EULA process. In an embodiment, the application controls whether the EULA which has currently been accepted by the user is adequate to allow access to the application and perform the requested operations.

The following is an example of the basic flow of the present invention. In this example a user, via a web client, makes a request to a secure gateway for an application resource as an authenticated user. The secure gateway determines the version of EULA that has previously been accepted by the user. The EULA version and acceptance status is added to a request header and the request is forwarded to the application. The application checks the EULA version which has been accepted by the user. In this example, the application determines that it requires a higher version to be accepted before the resource can be returned.

In an embodiment, the application will continue to block access by the user until it determines that the correct EULA version has been accepted by the user. In this embodiment, the secure gateway presents the corresponding EULA version to the web client, for the user to accept. Once the user has accepted the corresponding EULA version, the web client sends a notice of that acceptance to the secure gateway, which stores the acceptance/version. The secure gateway sends the EULA information to the application as HTTP headers in the request, and the application returns the application resource that was initially requested by the user via the web client. This embodiment is illustrated in the sequence diagram of FIG. 2 below and explained in the flow chart diagram of FIG. 3 below.

In another embodiment, the user will be blocked from any features of the application not supported by the version of the EULA currently accepted by the user. In this embodiment, the application returns the version of the resource that corresponds to the EULA version that has been accepted, and the secure gateway returns the application response to the web client. The user is then allowed to use the features of the application that correspond to the version of the EULA that the user has accepted. This embodiment is illustrated in the sequence diagram of FIG. 4 below and explained in the flow chart diagram of FIG. 5 below.

In various embodiments, the secure gateway stores the EULA versions for each application and each user. In an embodiment, the secure gateway provides updated EULA versions for applications to each user of those applications to allow the user to accept the updated EULA. In an embodiment, the secure gateway tracks the updated EULA for each application by monitoring responses from each application to each request from a user, and extracts the latest EULA version for each application.

Figure 1:
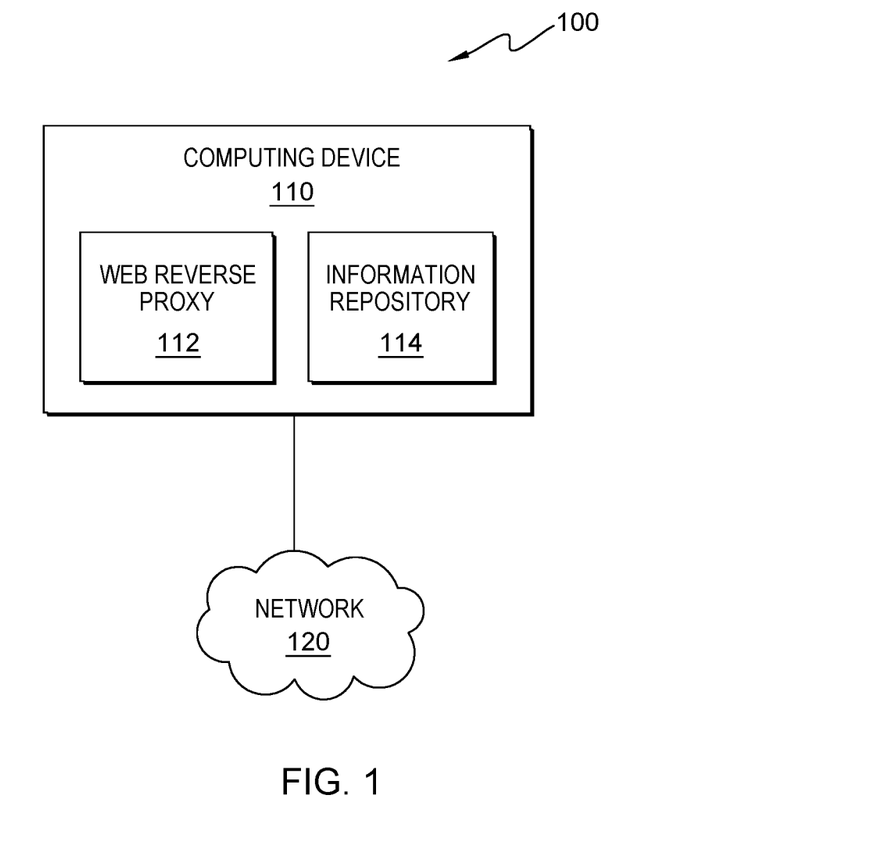
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of web reverse proxy 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes web reverse proxy 112. In an embodiment, web reverse proxy 112 is a program, application, or subprogram of a larger program for enforcing EULA version aware application response. In an alternative embodiment, web reverse proxy 112 may be located on any other device accessible by computing device 110 via network 120.

In an embodiment, computing device 110 includes information repository 114. In an embodiment, information repository 114 may be managed by web reverse proxy 112. In an alternate embodiment, information repository 114 may be managed by the operating system of the device, alone, or together with, web reverse proxy 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, license data, EULA version data, client data, application data, user data, authentication data, secure gateway data, API data, and other data that is received by web reverse proxy 112 from one or more sources, and data that is created by web reverse proxy 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
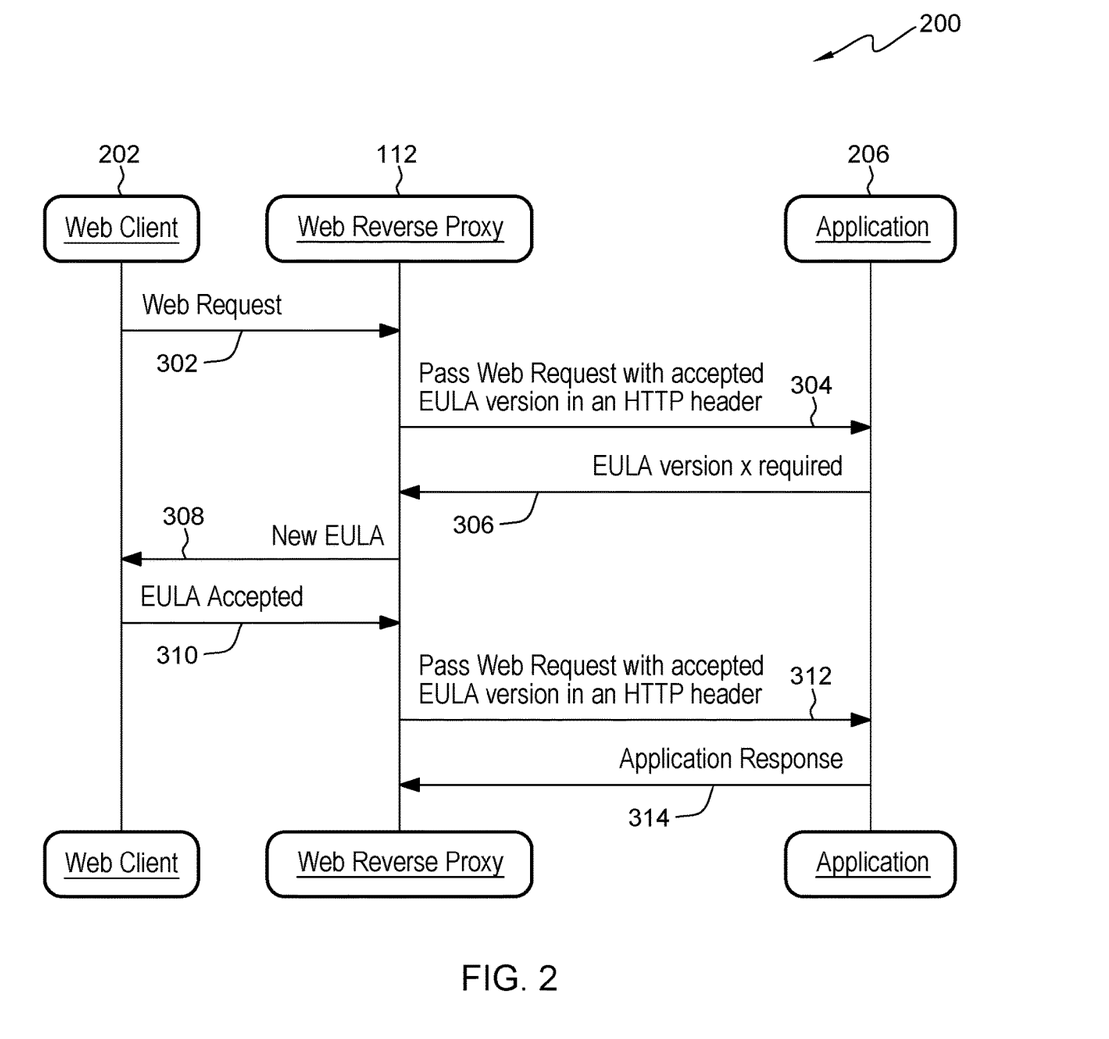
FIG. 2 is a sequence diagram that illustrates an example of an application for communicating EULA requirements between a web client and an application using a secure gateway, in accordance with an embodiment of the present invention.

FIG. 2 is a sequence diagram that illustrates an example of an application for communicating EULA requirements between a web client and an application using a secure gateway, in accordance with an embodiment of the present invention. In the embodiment illustrated in FIG. 2, the application will continue to block access by the user until the web reverse proxy indicates the correct EULA version has been accepted by the user.

Web sequence diagram 200 includes Web Client 202, which is typically operated by the user. Web sequence diagram 200 also includes Web reverse proxy 112, the program that runs on the secure gateway, e.g., computing device 110 from FIG. 1, which will handle requests to, and responses from the protected application, and Application 206, the application being protected by the web reverse proxy. In an embodiment, web reverse proxy 112 acts as an API gateway between the user and the application. In an embodiment, web reverse proxy 112 is a terminating server, and contains business logic, e.g., logic to determine when to authenticate, etc.

The reference designators 302 through 314 represent the steps in the flow diagram of FIG. 3 and are explained below.

Figure 3:
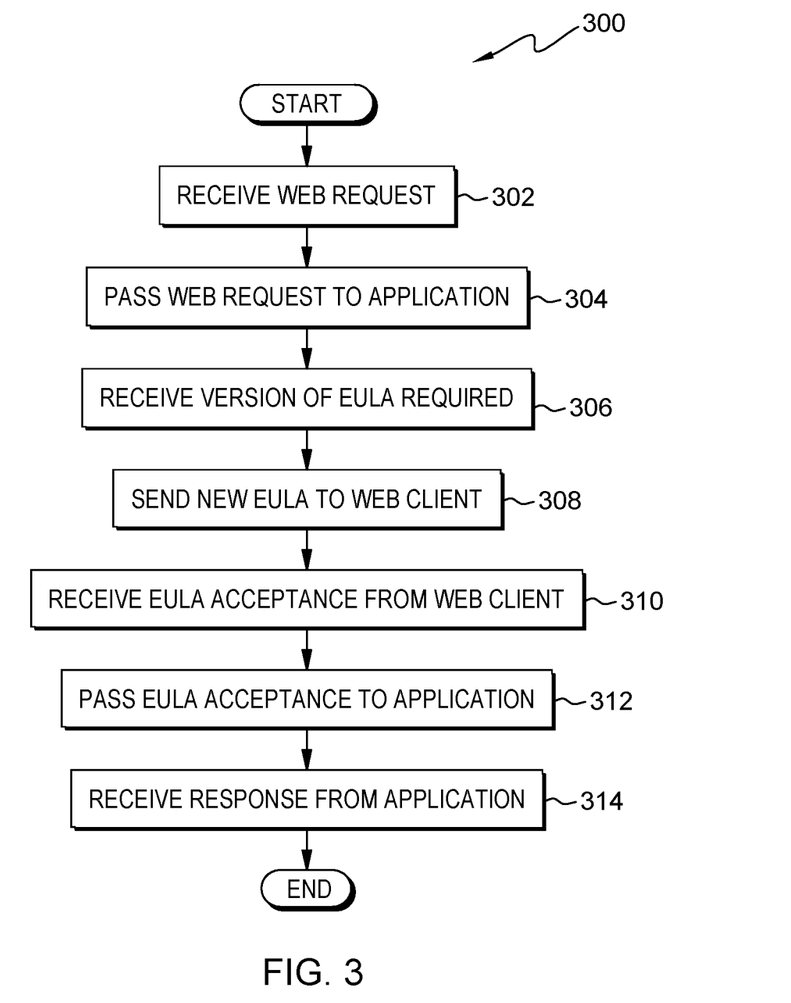
FIG. 3 is a flowchart depicting operational steps of the web reverse proxy, on a computing device within the distributed data processing environment of FIG. 1, for communicating EULA requirements between a web client and an application using a secure gateway, in accordance with an embodiment of the present invention.

FIG. 3 is a flowchart depicting operational steps of the web reverse proxy, on a computing device within the distributed data processing environment of FIG. 1, for communicating EULA requirements between a user, via a web client, and an application using a secure gateway, in accordance with an embodiment of the present invention. In an alternative embodiment, the steps of workflow 300 may be performed by any other program while working with web reverse proxy 112. It should be appreciated that embodiments of the present invention provide at least for communicating EULA requirements between a user and an application using a secure gateway. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In the embodiment illustrated in FIG. 3, the application will continue to block access by the user until it determines that the user has accepted the correct EULA version.

It should be appreciated that the process depicted in FIG. 3 illustrates one possible iteration of the operational steps performed by web reverse proxy 112 for communicating EULA requirements to a secure gateway, which repeats each time a web client requests access to an application served by the secure gateway.

In an embodiment, web reverse proxy 112 receives a web request from a web client for an application resource as an authenticated user. In an embodiment, web reverse proxy 112 passes the web request, including the EULA version that has been currently accepted by the user, to the application. In an embodiment, web reverse proxy 112 receives a response from the application with the EULA version it requires the web client to accept in order to access the application. In an embodiment, web reverse proxy 112 presents the corresponding EULA version to the web client for the user to accept. In an embodiment, web reverse proxy 112 receives a notification from the web client that the user has accepted the version of the EULA that was received from the application. In an embodiment, web reverse proxy 112 sends the EULA information to the application as HTTP headers in the request. In an embodiment, web reverse proxy 112 receives the response from the application and returns the application response to the web client. In an embodiment, web reverse proxy 112 then ends for this cycle.

Web reverse proxy 112 receives a web request (step 302). In an embodiment, web reverse proxy 112 receives a web request from a user via a web client for an application resource as an authenticated user. In an embodiment, web reverse proxy 112 determines the version of the EULA that has previously been accepted by the user. In an embodiment, web reverse proxy 112 adds the EULA version and acceptance status to a request to the application.

Web reverse proxy 112 passes the web request to the application (step 304). In an embodiment, web reverse proxy 112 passes the web request, including the EULA version that has been currently accepted by the user, to the application. In an embodiment, web reverse proxy 112 passes the web request as an HTTP header. In another embodiment, web reverse proxy 112 passes the request to the application using any means as would be known to a person of skill in the art.

Web reverse proxy 112 receives the version of the EULA required (step 306). In an embodiment, web reverse proxy 112 receives a response from the application with the EULA version the application requires the web client to accept in order to access the application.

Web reverse proxy 112 sends the new EULA to the web client (step 308). In an embodiment, web reverse proxy 112 sends a message to the user via the web client to present the corresponding EULA version to for the user to accept.

Web reverse proxy 112 receives the EULA acceptance from the web client (step 310). In an embodiment, web reverse proxy 112 receives a notification from the web client that the user has accepted the version of the EULA that was received from the application in step 306.

Web reverse proxy 112 passes the EULA acceptance to the application (step 312). In an embodiment, web reverse proxy 112 sends the EULA information to the application as HTTP headers in the request. In another embodiment, web reverse proxy 112 sends the EULA information to the application using any means as would be known to a person of skill in the art.

Web reverse proxy 112 receives a response from the application (step 314). In an embodiment, web reverse proxy 112 receives the response from the application and returns the application response to the web client. In an embodiment, web reverse proxy 112 then ends for this cycle.

Figure 4:
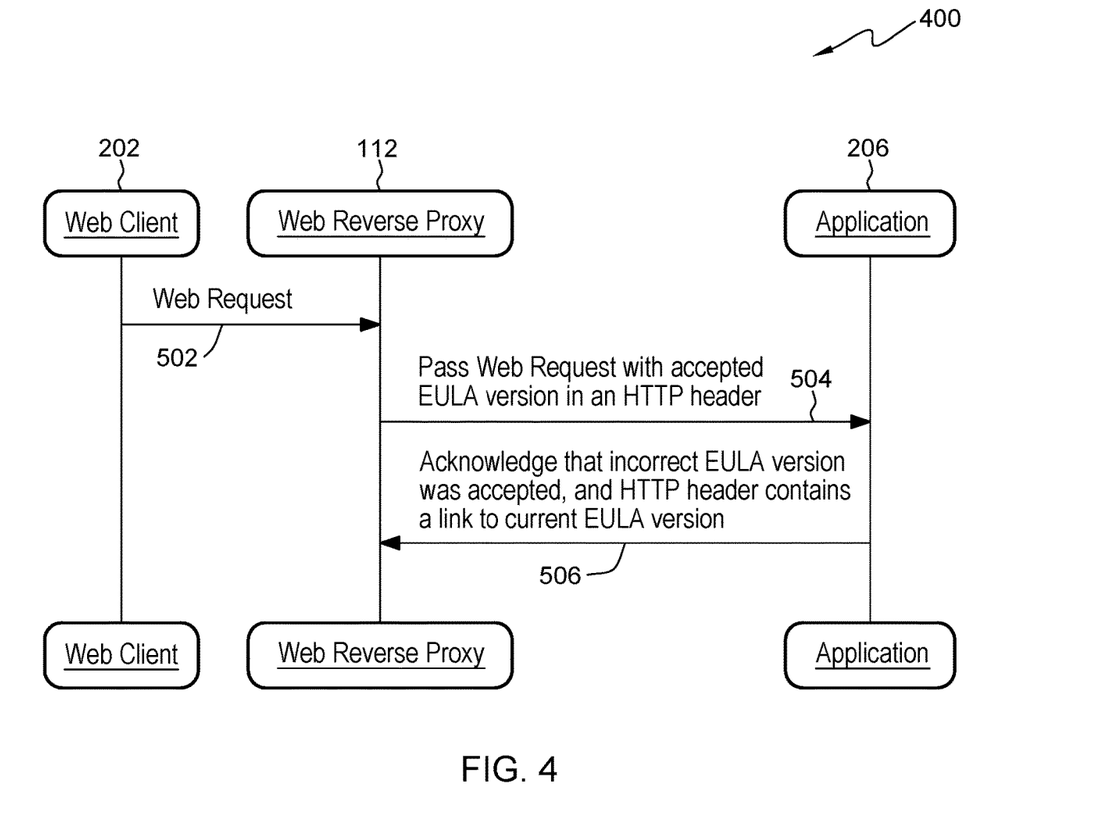
FIG. 4 is a sequence diagram that illustrates an example of an application for communicating EULA requirements between a web client and an application using a secure gateway, in accordance with another embodiment of the present invention.

FIG. 4 is a sequence diagram that illustrates an example of an application for communicating EULA requirements between a web client and an application using a secure gateway, in accordance with another embodiment of the present invention. In the embodiment illustrated in FIG. 4, a user requests, via a web client, access to an application, and the application produces a response for the client which is based on the version of the EULA which has previously been accepted by the user. In this embodiment, if the application detects that an older version of the EULA has been accepted, the application constructs a response based on the older EULA version. For example, the response may indicate that certain fields in an API response are excluded because those fields require a later EULA. In an embodiment, an additional HTTP header maybe added to the response which indicates the EULA version which would need to be accepted in order to receive the complete response.

Web sequence diagram 400 includes Web Client 202, which is typically operated by the user, web reverse proxy 112, the program that runs on the secure gateway, e.g., computing device 110 from FIG. 1, which will handle requests to, and responses from the protected application, and Application 206, the application being protected by the web reverse proxy. The reference designators 502 through 506 represent the steps in the flow diagram of FIG. 5 and are explained below.

Figure 5:
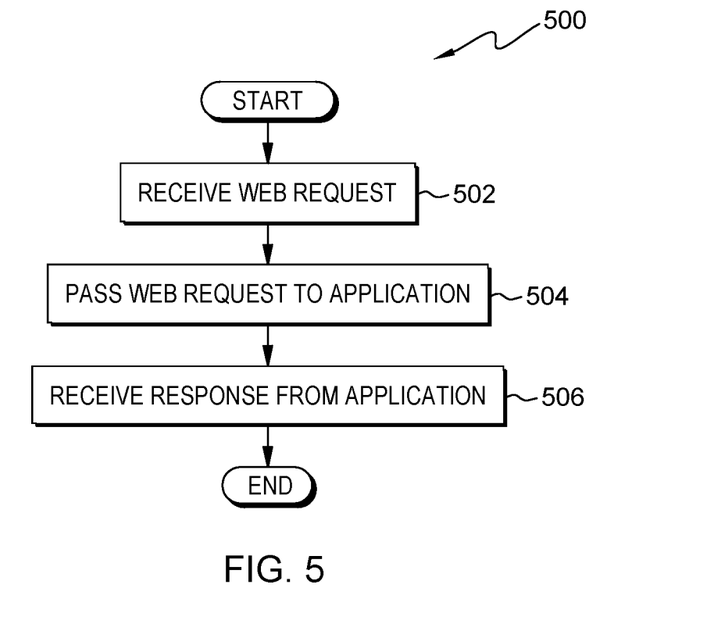
FIG. 5 is a flowchart depicting operational steps of the web reverse proxy, on a computing device within the distributed data processing environment of FIG. 1, for communicating EULA requirements between a web client and an application using a secure gateway, in accordance with an embodiment of the present invention.

FIG. 5 is a flowchart depicting operational steps of the web reverse proxy, on a computing device within the distributed data processing environment of FIG. 1, for communicating EULA requirements between a user, via a web client, and an application using a secure gateway, in accordance with an embodiment of the present invention. In an alternative embodiment, the steps of workflow 500 may be performed by any other program while working with web reverse proxy 112. It should be appreciated that embodiments of the present invention provide at least for communicating EULA requirements between a web client and an application using a secure gateway. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

In the embodiment illustrated in FIG. 5, the user will be blocked from any features of the application not supported by the version of the EULA currently accepted by the user.

It should be appreciated that the process depicted in FIG. 5 illustrates one possible iteration of the operational steps performed by web reverse proxy 112 for communicating EULA requirements to a secure gateway, which repeats each time a user requests access to an application served by the secure gateway.

In an embodiment, web reverse proxy 112 receives a web request from a web client for an application resource as an authenticated user. In an embodiment, web reverse proxy 112 passes the web request, including the EULA version that has been currently accepted by the user, to the application. In an embodiment, web reverse proxy 112 receives a response from the application acknowledging that an incorrect EULA version was accepted, and an HTTP header that contains a link to current EULA version. In an embodiment, web reverse proxy 112 then ends for this cycle.

Web reverse proxy 112 receives a web request (step 502). In an embodiment, web reverse proxy 112 receives a web request from a user via a web client for an application resource as an authenticated user. In an embodiment, web reverse proxy 112 determines the version of the EULA that has previously been accepted by the user. In an embodiment, web reverse proxy 112 adds the EULA version and acceptance status to a request to the application.

Web reverse proxy 112 passes the web request to the application (step 504). In an embodiment, web reverse proxy 112 passes the web request, including the EULA version that has been currently accepted by the user, to the application. In an embodiment, web reverse proxy 112 passes the web request as an HTTP header. In another embodiment, web reverse proxy 112 passes the request to the application using any means as would be known to a person of skill in the art.

Web reverse proxy 112 receives a response from the application (step 506). In an embodiment, web reverse proxy 112 receives a response from the application acknowledging that an incorrect EULA version was accepted. In an embodiment, the response from the application is a subset of the complete set of features supported by the application, where the subset is the allowable features that the user may access based on the version of the EULA that has previously been accepted by the user. In this embodiment, the user may access the application but only use the subset of features that are allowable with the version of the EULA that has previously been accepted by the user. In an embodiment, the response includes an HTTP header that contains a link to current EULA version.

In this embodiment, the application detects that an older version of the EULA has been accepted, and the application then constructs a response based on the older EULA version. For example, the response may indicate that in an API response certain fields are excluded because those fields require a later EULA. In an embodiment, an additional HTTP header maybe added to the response which indicates the EULA version which would need to be accepted in order to receive the complete response.

In an embodiment, web reverse proxy 112 sends the response based on the older EULA version to the web client. In an embodiment, web reverse proxy 112 also sends the additional HTTP header to the web client which indicates the EULA version which would need to be accepted in order to receive the complete response. In an embodiment, web reverse proxy 112 then ends for this cycle.

Figure 6:
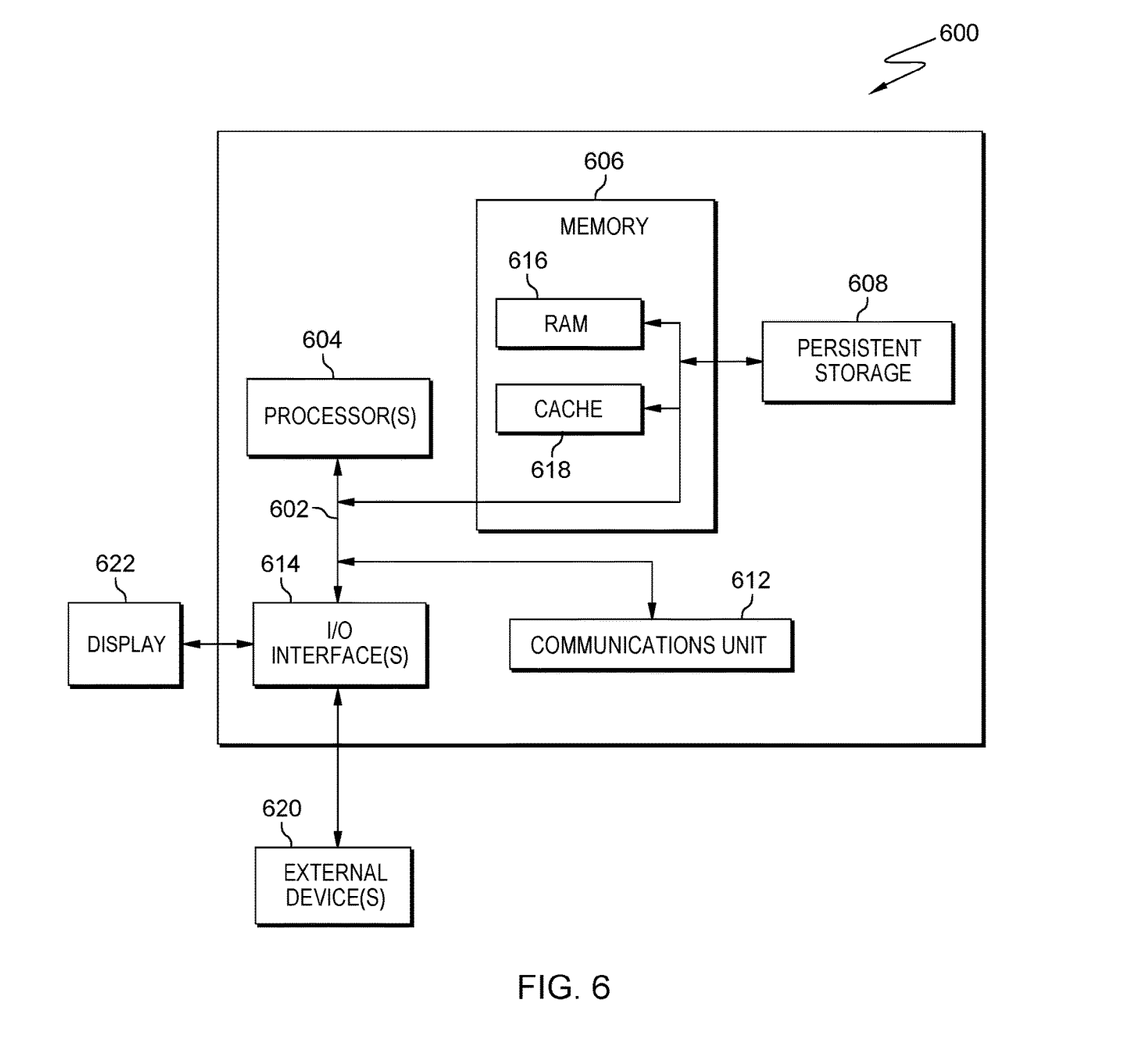
FIG. 6 depicts a block diagram of components of the computing devices executing the web reverse proxy within the distributed data processing environment of FIG. 1, in accordance with an embodiment of the present invention.

FIG. 6 is a block diagram depicting components of computing device 110 suitable for web reverse proxy 112, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for web reverse proxy 112 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., web reverse proxy 112, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising: responsive to receiving a request from a user to access an application, sending details of an End User License Agreement (EULA) to the application, wherein the details of the EULA are contained in one or more Hypertext Transfer Protocol (HTTP) headers; receiving a response from the application based on the details of the EULA, wherein the response includes a set of allowable features based on the version of the EULA accepted by the user, and wherein the set of allowable features is a subset of a complete set of features of the application;
    sending a message and the set of allowable features to the user, wherein the message contains the response from the application;
    storing the details of the EULA for the user and the application; providing an updated version of the EULA to the user, wherein the updated version is extracted from responses from the application; receiving a second EULA version, wherein the third EULA version allows the user to access the complete set of features of the application; sending the second EULA version to the user; and responsive to receiving an acceptance of the second EULA version from the user, sending the acceptance of the second EULA version to the application.

2. The computer-implemented method of claim 1, wherein the details of the EULA include at least one of whether the user has accepted the EULA and a first version of the EULA accepted by the user.

3. The computer-implemented method of claim 2, wherein receiving the response from the application based on the details of the EULA comprises:
    receiving, by the one or more computer processors, the response from the application, wherein the response from the application includes a set of allowable features based on the version of the EULA accepted by the user, wherein the set of allowable features is a subset of a complete set of features of the application; and
    sending, by the one or more computer processors, the set of allowable features based on the version of the EULA accepted by the user to the user.

4. The computer-implemented method of claim 1, wherein receiving the response from the application based on the details of the EULA comprises:
    receiving, by the one or more computer processors, the response from the application, wherein the response from the application includes a third EULA version required to run the application;
    sending, by the one or more computer processors, the third EULA version required to run the application to the user; and
    responsive to receiving an acceptance of the third EULA version required to run the application from the user, sending, by the one or more computer processors, the acceptance to the application.

5. A computer program product, the computer program product comprising one or more computer readable storage media and program instructions stored on the one or more computer readable storage media, the program instructions including instructions to:
    responsive to receiving a request from a user to access an application, send details of an End User License Agreement (EULA) to the application, wherein the details of the EULA are contained in one or more Hypertext Transfer Protocol (HTTP) headers;
    receive a response from the application based on the details of the EULA, wherein the response includes a set of allowable features based on the version of the EULA accepted by the user, and wherein the set of allowable features is a subset of a complete set of features of the application; send a message and the set of allowable features to the user, wherein the message contains the response from the application; store the details of the EULA for the user and the application;
    provide an updated version of the EULA to the user, wherein the updated version is extracted from responses from the application; receive a second EULA version, wherein the third EULA version allows the user to access the complete set of features of the application; send the second EULA version to the user; and
    responsive to receiving an acceptance of the second EULA version from the user, send the acceptance of the second EULA version to the application.

6. The computer program product of claim 5, wherein the details of the EULA include at least one of whether the user has accepted the EULA and a first version of the EULA accepted by the user.

7. The computer program product of claim 6, wherein receive a response from the application based on the details of the EULA comprises one or more of the following program instructions, stored on the one or more computer readable storage media, to:
    receive the response from the application, wherein the response from the application includes a set of allowable features based on the version of the EULA accepted by the user, wherein the set of allowable features is a subset of a complete set of features of the application; and
    send the set of allowable features based on the version of the EULA accepted by the user to the user.

8. The computer program product of claim 5, wherein receive a response from the application based on the details of the EULA comprises one or more of the following program instructions, stored on the one or more computer readable storage media, to:

receive the response from the application, wherein the response from the application includes a third EULA version required to run the application;

send the third EULA version required to run the application to the user; and responsive to receiving an acceptance of the third EULA version required to run the application from the user, send the acceptance to the application.

9. A computer system comprising: one or more computer processors; one or more computer readable storage media; and program instructions stored on the one or more computer readable storage media for execution by at least one of the one or more computer processors, the stored program instructions including instructions to:

responsive to receiving a request from a user to access an application, sending details of an End User License Agreement (EULA) to the application, wherein the details of the EULA are contained in one or more Hypertext Transfer Protocol (HTTP) headers; receiving a response from the application based on the details of the EULA, wherein the response includes a set of allowable features based on the version of the EULA accepted by the user, and wherein the set of allowable features is a subset of a complete set of features of the application; sending a message and the set of allowable features to the user, wherein the message contains the response from the application; storing the details of the EULA for the user and the application; providing an updated version of the EULA to the user, wherein the updated version is extracted from responses from the application; receiving a second EULA version, wherein the third EULA version allows the user to access the complete set of features of the application;

sending the second EULA version to the user; and responsive to receiving an acceptance of the second EULA version from the user, sending the acceptance of the second EULA version to the application.

10. The computer system of claim 9, wherein the details of the EULA include at least one of whether the user has accepted the EULA and a first version of the EULA accepted by the user.

11. The computer system of claim 10, wherein receive a response from the application based on the details of the EULA comprises one or more of the following program instructions, stored on the one or more computer readable storage media, to:

receive the response from the application, wherein the response from the application includes a set of allowable features based on the version of the EULA accepted by the user, wherein the set of allowable features is a subset of a complete set of features of the application; and send the set of allowable features based on the version of the EULA accepted by the user to the user.

12. The computer system of claim 9, wherein receive a response from the application based on the details of the EULA comprises one or more of the following program instructions, stored on the one or more computer readable storage media, to:

receive the response from the application, wherein the response from the application includes a third EULA version required to run the application;

send the third EULA version required to run the application to the user; and responsive to receiving an acceptance of the third EULA version required to run the application from the user, send the acceptance to the application.

\* \* \* \* \*